United States Patent
Takeda et al.

(10) Patent No.: US 7,884,903 B2
(45) Date of Patent: Feb. 8, 2011

(54) LIQUID CRYSTAL PANEL AND LIQUID CRYSTAL DISPLAY DEVICE

(75) Inventors: Kentarou Takeda, Ibaraki (JP); Seiji Umemoto, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 421 days.

(21) Appl. No.: 11/808,303

(22) Filed: Jun. 8, 2007

(65) Prior Publication Data
US 2007/0285602 A1 Dec. 13, 2007

(30) Foreign Application Priority Data
Jun. 9, 2006 (JP) .............................. 2006-160526

(51) Int. Cl.
*G02F 1/1335* (2006.01)
(52) U.S. Cl. ..................................... 349/117
(58) Field of Classification Search ........................ None
See application file for complete search history.

(56) References Cited

U.S. PATENT DOCUMENTS 5,818,615 A * 10/1998 Abileah et al. .............. 349/117
2006/0132686 A1 * 6/2006 Jeon et al. .................. 349/117
2006/0203162 A1 * 9/2006 Ito et al. ..................... 349/117
2009/0268133 A1 * 10/2009 Yoshimi et al. ............. 349/107

* cited by examiner

*Primary Examiner*—Michelle R Connelly Cushwa
(74) *Attorney, Agent, or Firm*—Westerman, Hattori, Daniels & Adrian, LLP

(57) ABSTRACT

The liquid crystal panel of the present invention has a liquid crystal cell having a pair of transparent substrates provided with a color filter having each color region of blue, green and red, and a liquid crystal layer formed by injecting a liquid crystal material between the transparent substrates; an optical compensating layer provided over the liquid crystal cell; and a light source for irradiating light, in which the optical compensating layer cancels out retardation in the thickness direction for light of a wavelength (G), which passes through a green region of the liquid crystal cell, and retardation in the thickness direction for light of a wavelength (R), which passes through a red region of the liquid crystal cell. The liquid crystal panel of the present invention can realize higher contrast in viewing from an oblique direction.

6 Claims, 3 Drawing Sheets

LIQUID CRYSTAL PANEL AND LIQUID CRYSTAL DISPLAY DEVICE

BACKGROUND OF THE INVENTION

1. Field of the Invention

The present invention relates to a liquid crystal panel with a color filter and a liquid crystal display device.

2. Description of the Related Art

In recent years, a liquid crystal display device has widely been used for monitors of a notebook computer and a television set, and the like. In particular, the use of a liquid crystal display device for a large-sized television set has rapidly been expanded.

On the occasion of viewing a liquid crystal display device from an oblique direction, high contrast ratio thereof is highly valued. In particular, the improvement of viewing angle properties is an important problem in a liquid crystal display device in color display.

Contrast ratio is used as one of indicators for evaluating performances of a liquid crystal display device. The contrast ratio is represented by the ratio between luminance in displaying white (white luminance) and luminance in displaying black (black luminance). Accordingly, higher white luminance and lower black luminance allow a liquid crystal display device having a higher contrast ratio. A liquid crystal display device having a high contrast ratio brings definite difference between white and black to allow favorable image display to be realized.

Incidentally, a liquid crystal layer into which a liquid crystal material is injected causes light leakage in the case of viewing from an oblique direction by reason of having birefringence (retardation) in itself. The light leakage causes contrast ratio to decrease in a liquid crystal display device. Then, in order to improve viewing angle properties of a liquid crystal display device, an optical compensating layer (also referred to as a compensating plate, a retardation plate and a viewing angle widening film) has conventionally been disposed in a liquid crystal cell. However, with regard to a liquid crystal panel with a color filter, light which passed through a liquid crystal layer and the color filter enters human eyes. Accordingly, it is necessary that the compensation including retardation in the thickness direction of a color filter as well as a liquid crystal layer be performed for the liquid crystal cell.

A liquid crystal display device is known, in which a retardation layer corresponding to each color region of a color filter is provided between two substrates as the compensation in consideration of the color filter (Japanese Unexamined Patent Publication No. 2002-122866). However, in this means, it is required that a retardation layer having a different retardation value be provided in each color region of a color filter.

SUMMARY OF THE INVENTION

The object of the present invention is to provide a liquid crystal panel and a liquid crystal display device, which can realize higher contrast in viewing from an oblique direction.

Through earnest studies under the above-mentioned object, the present inventors have completed the present invention by noticing that light which passes through a blue region of a color filter is sensed by human eyes with difficulty.

A liquid crystal panel of the present invention comprises a liquid crystal cell having a pair of transparent substrates provided with a color filter having each color region of blue, green and red, and a liquid crystal layer formed by injecting a liquid crystal material between the transparent substrates; an optical compensating layer provided over the liquid crystal cell; and a light source for irradiating light. The optical compensating layer cancels out retardation in the thickness direction for light of a wavelength (G) passing through a green region of the liquid crystal cell, and retardation in the thickness direction for light of a wavelength (R) passing through a red region of the liquid crystal cell.

The wavelength (G) represents a wavelength (nm) in which [luminous coefficient Y×emission spectrum of a light source] becomes the maximum in light of the light source passing through the green region of the liquid crystal cell, and the wavelength (R) represents a wavelength (nm) in which [luminous coefficient Y×emission spectrum of a light source] becomes the maximum in light of the light source passing through the red region of the liquid crystal cell.

Here, an optical compensating layer for canceling out retardation in the thickness direction for light of a wavelength (G) and retardation in the thickness direction for light of a wavelength (R) includes an optical compensating layer which compensates both of the retardation values in the thickness direction within 5 nm in an absolute value.

As described later, human eyes easily sense brightness of green light and red light (this indicator is denoted by a luminous coefficient Y), and brightness is influenced by an emission spectrum of a light source. Accordingly, the degree of brightness sensed by human eyes can be represented by [luminous coefficient Y×emission spectrum of a light source].

The liquid crystal panel of the present invention is provided with an optical compensating layer for canceling out retardation in the thickness direction for light of a wavelength (G), which passes through a green region of a liquid crystal cell, and retardation in the thickness direction for light of a wavelength (R), which passes through a red region of a liquid crystal cell. Thus, the liquid crystal panel can prevent leakage of light which passes through a green region and leakage of light which passes through a red region, easily sensed as brightness by human eyes. The prevention of such leakage of light allows black luminance to be lowered in a black display state of the liquid crystal panel, and consequently the liquid crystal panel having a high contrast ratio (white luminance/black luminance) to be provided.

Also, a liquid crystal panel of the present invention comprises a liquid crystal cell having a pair of transparent substrates provided with a color filter having each color region of blue, green and red, and a liquid crystal layer formed by injecting a liquid crystal material between the transparent substrates; an optical compensating layer provided over the liquid crystal cell; and a light source for irradiating light. The liquid crystal layer is a vertical alignment type and a relation between a retardation value in the thickness direction of the optical compensating layer $Rth_R(\lambda)$ and a retardation value in the thickness direction of the liquid crystal cell $Rth_L(\lambda)$ satisfies either of the following expression (1) and the following expression (2).

$$1.00 < Rth_R(610)/Rth_R(550) < 1.03 \text{ and } |Rth_L(550) - Rth_L(610)| \leq 18 \text{ nm} \qquad \text{the expression (1):}$$

$$0.96 < Rth_R(610)/Rth_R(550) < 1.00 \text{ and } |Rth_L(550) - Rth_L(610)| \leq 6 \text{ nm} \qquad \text{the expression (2):}$$

$Rth_R(550)$ represents a retardation value in the thickness direction of the optical compensating layer for light with a wavelength of 550 nm, and $Rth_R(610)$ represents a retardation value in the thickness direction of the optical compensating layer for light with a wavelength of 610 nm, and $Rth_L(550)$ represents a retardation value in the thickness direction (nm) of the liquid crystal cell for light with a wavelength of 550 nm passing through a green region, and $Rth_L(610)$ represents a retardation value in the thickness direction (nm) of the liquid crystal cell for light with a wavelength of 610 nm passing through a red region.

Preferably, the liquid crystal panel of the present invention is transmissive type or semitransmissive type, wherein the light source is disposed on the back side of the liquid crystal cell.

Preferably, the light source in the liquid crystal panel of the present invention is a three-wavelength tube.

Preferably, the optical compensating layer in the liquid crystal panel of the present invention is at least either of a compensating layer having a relation of $nx_R \cong ny_R > nz_R$ and a compensating layer having a relation of $nx_R > ny_R > nZ_R$.

$nx_R$ denotes a refractive index in the x-axis direction in a plane of the optical compensating layer (a direction for the maximum refractive index in the plane), $ny_R$ denotes a refractive index in the y-axis direction in a plane of the optical compensating layer (a direction orthogonal to the x-axis in the plane), and $nz_R$ denotes a refractive index in a direction orthogonal to the x-axis direction and the y-axis direction.

The present invention provides a liquid crystal display device having any of the above-mentioned liquid crystal panels.

DETAILED DESCRIPTION OF THE PREFERRED EMBODIMENTS

<Problem Solution Principle>

Liquid crystal panels can roughly be divided into transmissive type, reflective type and semitransmissive type by the disposition of a light source. A liquid crystal panel of transmissive type is one in which a light source (this light source is occasionally referred to as a back light hereinafter) is disposed on the back side of the liquid crystal cell. A liquid crystal panel of transmissive type transmits light of this back light to perform image display. A liquid crystal panel of reflective type is one in which a light source (this light source is occasionally referred to as a front light hereinafter) is disposed on the visible side of a liquid crystal cell, or a light source (this light source is occasionally referred to as a side light hereinafter) is disposed on the screen lateral side thereof. A liquid crystal panel of reflective type reflects light of the front light and the like by a reflecting plate to perform image display. Some of liquid crystal panels of reflective type utilize external fluorescent light and solar light as a light source. A liquid crystal panel of semitransmissive type has both of the above-mentioned transmissive type and reflective type together. A liquid crystal panel of semitransmissive type utilizes a light source of the back light in a dark place to perform image display, and meanwhile to reflect solar light in the light to perform image display.

All forms of the liquid crystal panel is one in which light which passed through a liquid crystal cell is sensed by human vision and an image thereof can be recognized.

The liquid crystal panel of the present invention can be applied to any of transmissive type, reflective type and semitransmissive type. Among these, it is particularly effective to apply the present invention to a liquid crystal panel of transmissive type or semitransmissive type.

Figure 1:
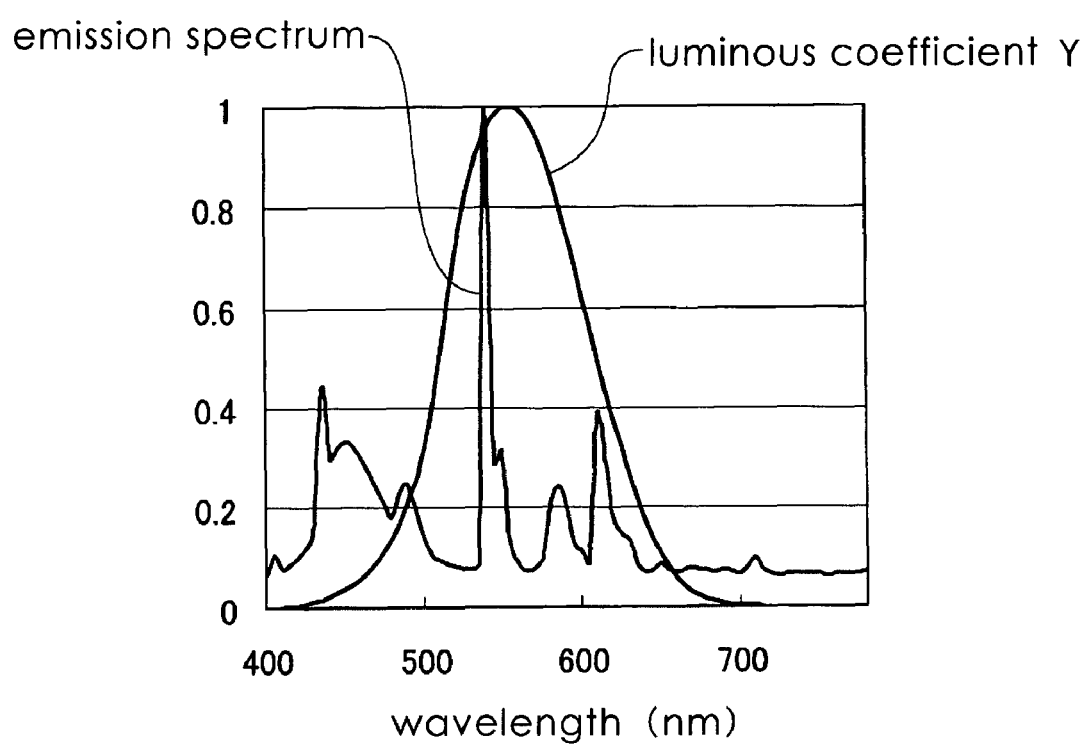
FIG. 1 is a reference graph chart showing the relative ratio of a luminous coefficient Y and the relative ratio of an emission spectrum.

Next, the indicator of brightness sensed by human eyes can be represented by a luminous coefficient Y. The luminous coefficient Y forms a graph as shown in FIG. 1. The graph represents wavelength in the horizontal axis, and the relative ratio of luminous coefficient at each wavelength (relative ratio in which the maximum value of luminous coefficient is determined as '1') in the vertical axis. As clarified from this drawing, human eyes sense brightness of light with a wavelength of around 550 nm most easily, and sense brightness with more difficulty toward longer wavelength side and shorter wavelength side on the basis of this wavelength.

On the other hand, as described above, image display of a liquid crystal panel is sensed by human vision by reason that light which passed through a liquid crystal cell enters human eyes from the visible side of the liquid crystal panel. Accordingly, brightness sensed by human eyes is influenced also by intensity of light which passes through a liquid crystal cell.

A light source called a three-wavelength tube is generally used for the above-mentioned back light. The three-wavelength tube is occasionally used also for the front light and the side light. The three-wavelength tube has at least three peaks of emission spectrum in visible light range. FIG. 1 also shows an emission spectrum of fluorescent light generally used as the back light of a liquid crystal display device. Typically, the three-wavelength tube has a peak of emission spectrum at each of wavelengths of 400 to 500 nm, wavelengths of 500 to 590 nm and wavelengths of 590 to 750 nm. Among the peaks, the three-wavelength tube has the maximum peak at wavelengths of 500 to 590 nm. The three-wavelength tube exemplified in FIG. 1 is one having the maximum peak of emission spectrum at a wavelength of around 550 nm, and peaks also at a wavelength of around 610 nm and a wavelength of around 430 nm.

The graph of emission spectrum represents wavelength in the horizontal axis, and the relative ratio of emission spectrum at each wavelength (relative ratio in which the maximum value of emission spectrum is determined as '1') in the vertical axis.

Figure 2:
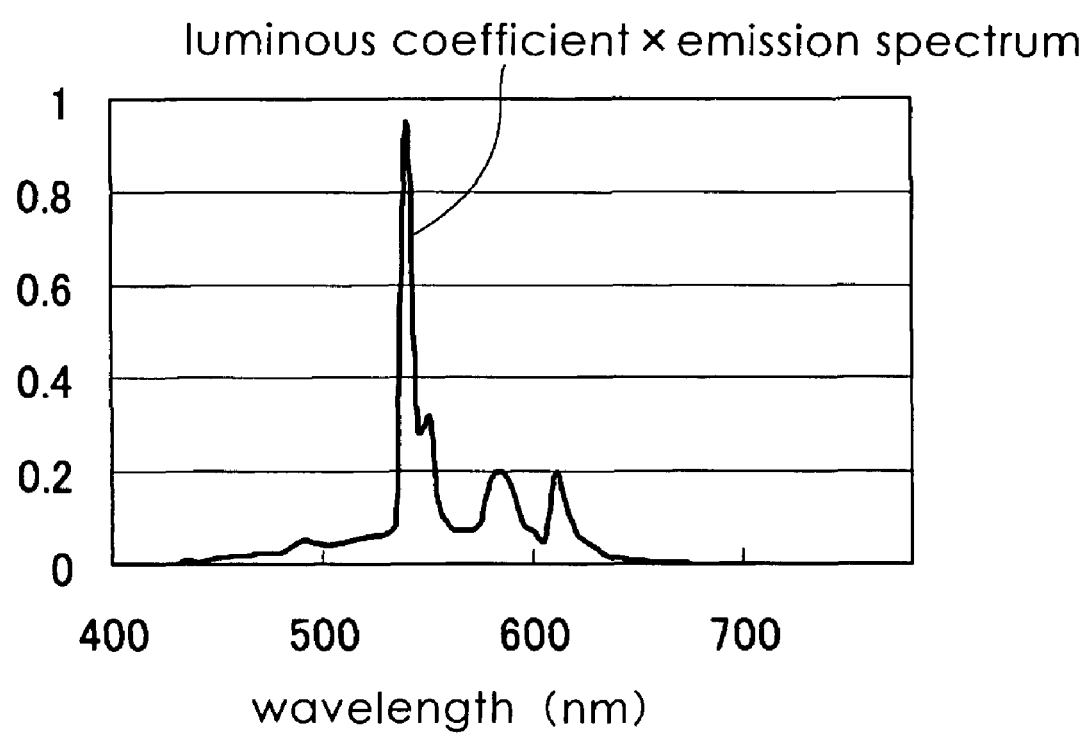
FIG. 2 is a reference graph chart showing the product of the luminous coefficient Y and the emission spectrum of FIG. 1.

In view of the above, brightness sensed by human eyes is represented by the product of the luminous coefficient Y and the emission spectrum. FIG. 2 shows the product of the luminous coefficient Y and the emission spectrum of FIG. 1.

As is clear from FIG. 2, human eyes scarcely sense brightness of light with wavelengths of approximately 400 to 530 nm. Human eyes sense brightness of light with wavelengths of approximately 530 to 570 nm very easily, and secondly sense brightness of light with wavelengths of approximately 570 to 620 nm.

On the other hand, light which passes through a blue region (a portion provided with a blue color filter) of a liquid crystal cell has shorter wavelengths than approximately 500 nm. Light which passes through a green region (a portion provided with a green color filter) of a liquid crystal cell has wavelengths of approximately 500 to 590 nm. Light which passes through a red region (a portion provided with a red color filter) of a liquid crystal cell has longer wavelengths than approximately 590 nm.

Accordingly, human eyes viewing image display of a liquid crystal panel scarcely sense brightness of light which passes through a blue region of a liquid crystal cell. On the other hand, human eyes sense brightness of light which passes through a green region of a liquid crystal cell most easily, and secondly brightness of light which passes through a red region thereof.

The prevention of leakage of this light, which passes through a green region and a red region and is easily sensed as brightness, allows black luminance of a liquid crystal panel to be lowered in a black display state thereof For example, light with a wavelength of 550 nm in a green region is easily sensed by human eyes and light with a wavelength of 610 nm in a red region is easily sensed by human eyes, so that the prevention of leakage of light with these wavelengths allows black luminance of a liquid crystal panel to be lowered.

<Constitution of the Present Invention>

The liquid crystal panel of the present invention has a liquid crystal cell having a pair of transparent substrates at least one of which is provided with a color filter of each color of blue, green and red, and a liquid crystal layer in which a liquid crystal material is injected between these substrates; an optical compensating layer provided over the liquid crystal cell; and a light source for irradiating light.

This optical compensating layer to be used is one which exhibits wavelength dispersion canceling out retardation in the thickness direction for light of a wavelength (G), which passes through a green region of a liquid crystal cell, and retardation in the thickness direction for light of a wavelength (R), which passes through a red region of a liquid crystal cell.

However, the wavelength (G) represents a wavelength (nm) in which [luminous coefficient Y×emission spectrum of a light source] becomes the maximum in light of a light source, which passes through a green region of a liquid crystal cell, and the wavelength (R) represents a wavelength (nm) in which [luminous coefficient Y×emission spectrum of a light source] becomes the maximum in light of a light source, which passes through a red region of a liquid crystal cell.

The above-mentioned wavelength (G) and wavelength (R) are typically such as approximately 530 to 570 nm and 600 to 640 nm respectively though influenced by the difference in the peak of an emission spectrum of a light source (refer to FIG. 2).

Light which passes through a green region of a liquid crystal cell signifies light which passes through a portion provided with a green color filter in a liquid crystal cell. Light which passes through a red region of a liquid crystal cell signifies light which passes through a portion provided with a red color filter in a liquid crystal cell.

Hereinafter in the present specification, a retardation value in the thickness direction of a liquid crystal cell for light of a wavelength (G), which passes through a green region of a liquid crystal cell, is referred to as "$Rth_L(G)$", and a retardation value in the thickness direction of a liquid crystal cell for light of a wavelength (R), which passes through a red region of a liquid crystal cell, is referred to as "$Rth_L(R)$".

The retardation value in the thickness direction is calculated by $Rth_L(\lambda)=\{(nx_L+ny_L)/2-nz_L\} \times d_L$ (measured at a temperature of 23° C.). In the expression, $nx_L$ denotes a refractive index in the x-axis direction in the plane of a liquid crystal cell (a direction for the maximum refractive index in the plane), $ny_L$ denotes a refractive index in the y-axis direction in the plane of a liquid crystal cell (a direction orthogonal to the x-axis), $nz_L$ denotes a refractive index in a direction orthogonal to the x-axis direction and the y-axis direction of a liquid crystal cell (a thickness direction), and $d_L$ denotes the thickness (nm) of a liquid crystal cell.

The above-mentioned liquid crystal panel is provided with an optical compensating layer for canceling out $Rth_L(G)$ and $Rth_L(R)$, so that leakage of light which passes through a green region and a red region can be prevented in the case of viewing the liquid crystal panel from an oblique direction.

The prevention of the light leakage allows black luminance of a liquid crystal panel to be lowered for the above-mentioned reason. Accordingly, the present invention can provide a liquid crystal panel having higher contrast ratio (white luminance/black luminance).

Here, the optical compensating layer for canceling out $Rth_L(G)$ and $Rth_L(R)$ includes an optical compensating layer exhibiting a retardation value in the thickness direction for canceling out $Rth_L(G)$ and $Rth_L(R)$ to approximately 0 as well as an optical compensating layer for substantially canceling out $Rth_L(G)$ and $Rth_L(R)$. The reason therefor is that it is technically difficult to cancel out $Rth_L(G)$ and $Rth_L(R)$ to accurately 0.

For example, the optical compensating layer for substantially canceling out $Rth_L(G)$ and $Rth_L(R)$ corresponds to an optical compensating layer which compensates $Rth_L(G)$ and $Rth_L(R)$ within 5 nm in an absolute value.

The above-mentioned optical compensating layer is not particularly limited if it can substantially cancel out $Rth_L(G)$ and $Rth_L(R)$, and any appropriate layer can be used.

The setting of the above-mentioned optical compensating layer can roughly be divided into [a] a technique of measuring $Rth_L(G)$ and $Rth_L(R)$ of an intended liquid crystal cell to design an optical compensating layer exhibiting wavelength dispersion of a retardation value in the thickness direction for canceling out these, and [b] a technique of selecting a known optical compensating layer to design $Rth_L(G)$ and $Rth_L(R)$ of a liquid crystal cell so as to adapt to wavelength dispersion of a retardation value in the thickness direction of this optical compensating layer.

In the above-mentioned technique [a], each of $Rth_L(G)$ and $Rth_L(R)$ is measured in a desirable liquid crystal cell (for example, a conventionally known liquid crystal cell). Then, an optical compensating layer capable of canceling out both of these retardation values in the thickness direction is designed, and such an optical compensating layer is disposed on the back side and/or the visible side of a liquid crystal cell, whereby a liquid crystal panel of the present invention can be configured.

In the above-mentioned technique [b], wavelength dispersion of a retardation value in the thickness direction of a desirable optical compensating layer (for example, a conventionally known retardation film) is measured, and then retardation value in the thickness direction of an optical compensating layer, corresponding to each of wavelength (G) and wavelength (R), proves by measuring this wavelength dispersion. Then, retardation in the thickness direction in a green region and a red region of a liquid crystal cell is designed so that $Rth_L(G)$ and $Rth_L(R)$ of a liquid crystal cell can be canceled out by such an optical compensating layer.

Either of the techniques can be used for the present invention and yet the above-mentioned technique [b] is preferable. The reason therefor is that, for example, in the case of a liquid crystal cell having a very large difference between $Rth_L(G)$ and $Rth_L(R)$ ($|Rth_L(G)-Rth_L(R)|$), it is required in the above-mentioned technique [a] that an optical compensating layer having a very steep slope of wavelength dispersion of retardation value in the thickness direction be designed for canceling out this difference; however, the optical compensating layer having a steep slope of wavelength dispersion is of extremely few kinds and forming materials for the optical compensating layer are extremely limited.

A specific example of a liquid crystal panel on the basis of the above-mentioned technique [b] is hereinafter described.

In the technique [b], an optical compensating layer is selected to design $Rth_L(G)$ and $Rth_L(R)$ of a liquid crystal cell so as to adapt to wavelength dispersion of the retardation value in the thickness direction thereof. Accordingly, the optical compensating layer is not particularly limited, and conventionally known layers can be used.

Examples of the optical compensating layer include known materials having birefringence in the thickness direction, such as various kinds of polymeric films subjected to drawing treatment, oriented films of liquid crystalline compositions such as liquid crystal materials, and solidifying layers (curing layers) of the liquid crystalline compositions. Examples of materials for the polymeric films include norbornene polymer films, carbonate polymer films, imide polymer films, amide-imide polymer films, vinyl alcohol polymer films, cellulosic polymer films, styrene polymer films, methyl acrylate polymer films and olefinic polymer films. These polymeric films can develop predetermined retardation and serve as the optical compensating layer by subjecting to drawing treatment after film production. Examples of the oriented films of liquid crystalline compositions include films in which a composition containing liquid crystal materials is oriented on an oriented film subjected to rubbing treatment. Examples of the above-mentioned solidifying layers of the liquid crystalline compositions include solidifying layers (curing layers) of liquid crystalline compositions containing a discotic liquid crystal compound as described in Japanese Unexamined Patent Publication No. Hei 7-146409. Also, examples of the above-mentioned solidifying layers of the liquid crystalline compositions include solidifying layers (curing layers) of liquid crystalline compositions containing a calamitic liquid crystal compound oriented in planar sequence as described in Japanese Unexamined Patent Publication No. 2003-187623.

In the present invention, the polymeric films exhibiting predetermined retardation are preferably used as the above-mentioned optical compensating layer by reason of being versatile. Examples of the versatile polymeric films exhibiting predetermined retardation in the thickness direction include norbornene polymer films, carbonate polymer films and imide polymer films. Examples of norbornene polymer films to be used include trade name: "ARTON", manufactured by JSR Corporation. Examples of carbonate polymer films to be used include trade name: "PURE-ACE WR (WRF)", manufactured by TEIJIN LIMITED. Examples of imide polymer films to be used include trade name: "NIB-COM-NXP", manufactured by NITTO DENKO CORPORATION.

The above-mentioned films under the trade name: "ARTON" manufactured by JSR Corporation are films in which a retardation value in the thickness direction $Rth_R(\lambda)$ is approximately constant from short wavelength side to long wavelength side (hereinafter, the case where retardation is approximately constant from short wavelength side to long wavelength side is occasionally referred to as 'flat wavelength dispersion').

Generally, versatile examples of an optical compensating layer exhibiting flat wavelength dispersion include the case of exhibiting wavelength dispersion as the ratio of $Rth_R(610)$ to $Rth_R(550)$ ($Rth_R(610)/Rth_R(550)$) being $0.99 < Rth_R(610)/Rth_R(550) < 1.00$.

The above-mentioned films under the trade name: "PURE-ACE WR (WRF)" manufactured by TEIJIN LIMITED are films in which the retardation value in the thickness direction $Rth_R(\lambda)$ increases from short wavelength side toward long wavelength side (hereinafter, the case where retardation increases from short wavelength side toward long wavelength side is occasionally referred to as 'inverse wavelength dispersion').

Generally, versatile examples of an optical compensating layer exhibiting inverse wavelength dispersion include the case of exhibiting wavelength dispersion as the ratio of $Rth_R(610)$ to $Rth_R(550)$ ($Rth_R(610)/Rth_R(550)$) being $1.00 < Rth_R(610)/Rth_R(550) < 1.03$.

The above-mentioned films under the trade name: "NIB-COM-NXP" manufactured by NITTO DENKO CORPORATION are films in which the retardation value in the thickness direction $Rth_R(\lambda)$ decreases from short wavelength side toward long wavelength side (hereinafter, the case where retardation decreases from short wavelength side toward long wavelength side is occasionally referred to as 'positive wavelength dispersion').

Generally, versatile examples of an optical compensating layer exhibiting positive wavelength dispersion include the case of exhibiting wavelength dispersion as the ratio of $Rth_R(610)$ to $Rth_R(550)$ ($Rth_R(610)/Rth_R(550)$) being $0.96 < Rth_R(610)/Rth_R(550) < 1.00$.

$Rth_R(\lambda)$ denotes a retardation value in the thickness direction of an optical compensating layer at a temperature of 23° C. and a wavelength of $\lambda$. Therefore, $Rth_R(550)$ denotes a retardation value in the thickness direction of an optical compensating layer at a wavelength of 550 nm, and $Rth_R(610)$ denotes a retardation value in the thickness direction of an optical compensating layer at a wavelength of 610 nm. $Rth_R(\lambda)$ is calculated by $Rth_R(\lambda) = \{(nx_R + ny_R)/2 - nz_R\} \times d_R$ (measured at a temperature of 23° C.). In the expression, $nx_R$ denotes a refractive index in the x-axis direction in the plane of an optical compensating layer (a direction for the maximum refractive index in the plane), $ny_R$ denotes a refractive index in the y-axis direction in the plane of an optical compensating layer (a direction orthogonal to the x-axis), $nz_R$ denotes a refractive index in a direction orthogonal to the x-axis direction and the y-axis direction of an optical compensating layer (a thickness direction), and $d_R$ denotes the thickness (nm) of an optical compensating layer.

Next, retardation value in the thickness direction of a liquid crystal cell is designed for a versatile optical compensating layer exhibiting the above-mentioned wavelength dispersions.

First, a preferable type of a liquid crystal layer used in the present invention is a vertical alignment type (VA mode) and a liquid crystal layer of vertical alignment type exhibits birefringence of $nx \approx ny < nz$ (a so-called positive C plate). With regard to wavelength dispersion of a retardation value in the thickness direction of a versatile liquid crystal layer of vertical alignment type, $Rth_L(610)/Rth_L(550)$ is 0.978, which denotes positive wavelength dispersion. In the case where the retardation value in the thickness direction at a wavelength of 550 nm is −350 nm in a liquid crystal layer exhibiting slope of the wavelength dispersion, the retardation value in the thickness direction at a wavelength of 610 nm is approximately −342 nm (−350 nm×0.978).

When $Rth_R(550)$ of an optical compensating layer (for example, the above-mentioned WRF film) exhibiting the above-mentioned inverse wavelength dispersion is determined as 350 nm so as to cancel out the retardation value at a wavelength of 550 nm in a liquid crystal cell having this liquid crystal layer, the maximum value of $Rth_R(610)$ is approximately 360 nm (1.03×350 nm) from the above-mentioned expression: $1.00 < Rth_R(610)/Rth_R(550) < 1.03$.

Accordingly, an absolute value of difference between $Rth_L(610)$ of a liquid crystal layer and $Rth_R(610)$ of an optical compensating layer in inverse wavelength dispersion is 18 nm at the maximum. Therefore, in the case of using an optical compensating layer exhibiting $1.00 < Rth_R(610)/Rth_R(550) < 1.03$, a liquid crystal cell is designed to exhibit $Rth_L(550)$−

$Rth_L(610) \geqq 0$ and $|Rth_L(550)-Rth_L(610)| \leqq 18$ nm, so that the above-mentioned optical compensating layer exhibiting slope of inverse wavelength dispersion allows the liquid crystal cell to be compensated.

On the other hand, when $Rth_R(550)$ of an optical compensating layer (for example, imide polymer film) exhibiting the above-mentioned positive wavelength dispersion is determined as 350 nm so as to cancel out the retardation value at a wavelength of 550 nm in a liquid crystal cell having a liquid crystal layer, the minimum value of $Rth_R(610)$ is approximately 336 nm ($0.96 \times 350$ nm) from the above-mentioned expression: $0.96 < Rth_R(610)/Rth_R(550) < 1.00$.

Accordingly, an absolute value of difference between $Rth_L(610)$ of a liquid crystal layer and $Rth_R(610)$ of an optical compensating layer in positive wavelength dispersion is 6 nm at the maximum. Therefore, in the case of using an optical compensating layer exhibiting $0.96 < Rth_R(610)/Rth_R(550) < 1.00$, a liquid crystal cell is designed to exhibit $Rth_L(550) - Rth_L(610) < 0$ and $|Rth_L(550)-Rth_L(610)| \leqq 6$ nm, so that the above-mentioned optical compensating layer exhibiting slope of positive wavelength dispersion allows the liquid crystal cell to be compensated.

<Design Method for Retardation Value in the Thickness Direction of Liquid Crystal Cell>

As described above, the retardation value in the thickness direction of a liquid crystal cell is designed so as to be canceled out by an optical compensating layer to be used.

Examples of a design method for the retardation value in the thickness direction for light which passes through a green region of a liquid crystal cell (such as $Rth_L(550)$) and the retardation value in the thickness direction for light which passes through a red region thereof (such as $Rth_L(610)$) include [A] a method of changing the thickness of a liquid crystal layer in each color region, [B] a method of changing retardation value in the thickness direction of a color filter of each color and [C] a method of using both of the above-mentioned [A] and [B].

Generally, a liquid crystal cell comprises component members such as a pair of transparent substrates, a liquid crystal layer, a color filter, and an electrode element for driving a liquid crystal material. A liquid crystal cell in a vertical alignment mode is greatly influenced by retardation in the thickness direction of a liquid crystal layer and a color filter among these component members.

Then, the above-mentioned method [A] is very effective. The reason therefore is that the retardation value in the thickness direction of a liquid crystal layer is generally higher when the retardation value in the thickness direction of a color filter is compared with the retardation value in the thickness direction of a liquid crystal layer of a vertical alignment type. Accordingly, a liquid crystal cell satisfying the above-mentioned relation can be prepared by merely adjusting the thickness of a liquid crystal layer.

The above-mentioned method [A] of changing the thickness of a liquid crystal layer in each color region is to properly modify the thickness Dg of a liquid crystal layer corresponding to a green region (that is, the thickness Dg is the thickness of a liquid crystal layer in a portion where a green color filter is formed. It is also called a cell gap) and the thickness Dr of a liquid crystal layer corresponding to a red region (that is, the thickness Dr is the thickness of a liquid crystal layer in a portion where a red color filter is formed. It is also called a cell gap) in consideration of the retardation value in the thickness direction. For example, in the case of decreasing the retardation value in the thickness direction of a liquid crystal cell for light which passes through a green region, Dg is thinly formed.

Examples of a method of designing the above-mentioned Dg and Dr into a predetermined thickness include [i] a method of changing the thickness of each color filter and [ii] a method of forming irregularities on a substrate with a predetermined pattern.

Examples of the above-mentioned method [i] include a method of adjusting the coating thickness of a coloring composition composing each color filter to a desirable thickness.

The formation of the above-mentioned each color filter can be performed by a printing method and a photolithographic method, for example. Examples of the printing method include flexographic printing, offset printing and screen printing. In the case of adopting the printing method, the printing thickness of a coloring composition composing each color filter is determined for each color. In the case of the photolithographic method, a coloring composition is coated to an appropriate thickness to thereafter perform exposure and development. The coating thickness of a coloring composition in each color is determined for each color during coating. The coating can be performed by a spin coat method, for example. The adjustment of the coating thickness can be performed by adjusting the number of revolutions and time of revolution of a spin coater.

Next, examples of the above-mentioned method [ii] of forming irregularities on a substrate with a predetermined pattern include a method of forming irregularities in an interlayer insulating film on an active matrix substrate. For example, a portion with a green color filter formed is formed most convexly and a portion with a red color filter formed is formed concavely (or flat). In this manner, the thickness Dg and Dr corresponding to each color region of a liquid crystal layer can properly be designed. The above-mentioned irregularities formation can be realized by adjusting intensity and/or irradiation time of ultraviolet rays irradiated on a portion corresponding to a formation position of each color filter on the occasion of forming an interlayer insulating film.

Next, the above-mentioned method [B] of changing the retardation value in the thickness direction of a color filter of each color is a method of properly designing the retardation value in the thickness direction of a color filter of each color while the thickness of a liquid crystal layer is the same in each color region. The method of changing the retardation value in the thickness direction of a color filter of each color is, for example, to change the retardation value in the thickness direction of a resin of a coloring matter carrier in a green region and a red region. For example, a resin having a different retardation value in the thickness direction from the resin of a coloring matter carrier in other color regions is preferably used for the resin of a coloring matter carrier in at least one color region. A resin having a different retardation value in the thickness direction is also preferably used as the resin of a coloring matter carrier in a green region and a red region.

Forming materials and forming methods for a color filter are separately described in detail.

The retardation value in the thickness direction of the resin of a coloring matter carrier can be controlled by a method of controlling viscosity of a resin during dissolution, a method of controlling Δn (birefringence) of a resin and the like.

With regard to a method of controlling viscosity of a resin during dissolution, the use of two kinds of transparent resins different in molecular-weight distribution allows a transparent resin high in the retardation value in the thickness direction and a transparent resin low therein to be prepared.

A resin having a higher molecular weight easily causes intermolecular tangling, so that viscosity is increased even though concentration is the same when being dissolved in a solvent. Therefore, the molecular state is fixed at an earlier stage in the drying process after coating. Thus, when the retardation value in the thickness direction is developed in the further drying process thereafter, a relatively high retardation value in the thickness direction is caused as compared with the use of a resin having a lower molecular weight. Crosslinking in this state by electron rays, heat or other methods allows a cured matter having a controlled retardation value in the thickness direction to be obtained.

Next, with regard to another form of a method of controlling viscosity of a resin during dissolution, the use of two kinds of transparent resins different in intermolecular interaction allows a transparent resin high in the retardation value in the thickness direction and a transparent resin low therein to be prepared. For example, between a resin having a functional group in a side chain and a resin having no functional group therein, a resin having a functional group is higher in viscosity, so that a relatively high retardation value in the thickness direction is caused for the same reason as described above.

The retardation value in the thickness direction can also be controlled by a method of substituting a hydrogen group and a hydrocarbon group with a fluorine group.

The retardation can also be controlled to some degree by changing the kind and concentration of the solvent in coating a mixture of a coloring matter carrier and a pigment. In the case where solvent viscosity during curing is relatively low, a color filter low in retardation value in the thickness direction can be formed.

Next, examples of a method of controlling Δn of a resin include the use of different kinds of resins. For example, an epoxy resin is generally low in the retardation value in the thickness direction as compared with a polyimide resin. The use of different resins as the resin of a coloring matter carrier of a coloring composition in each color region allows the retardation value in the thickness direction in each color region to be controlled.

In the case of fixing a main chain skeleton, the substitution of a side chain with an element higher in electrophilicity allows the retardation value in the thickness direction to be lowered. On the other hand, increase of conjugated electrons in a main chain skeleton, for example, the introduction of an aromatic ring allows the retardation value in the thickness direction to be raised.

<Forming Materials and Forming Methods for Color Filter>

Each color region of a color filter is formed by coating a coloring composition on a transparent substrate on the visible side. A coloring composition has a transparent resin, a coloring matter carrier comprising a precursor thereof and a coloring matter, and preferably contains a photopolymerization initiator.

The transparent resin is a resin having a transmittance of preferably 80% or more, more preferably 95% or more in the whole wavelength range of 400 to 700 nm in the visible light range.

The transparent resin contains a thermoplastic resin, a thermosetting resin and a photosensitive resin, and a precursor thereof contains a monomer or an oligomer, which is cured by radiation exposure to produce a transparent resin.

Examples of the thermoplastic resin include butyral resin, a styrene-maleic acid copolymer, chlorinated polyethylene, chlorinated polypropylene, polyvinyl chloride, a vinyl chloride-vinyl acetate copolymer, polyvinyl acetate, polyurethane resin, polyester resin, acrylic resin, alkyd resin, polystyrene, polyamide resin, gum resin, cyclized rubber resin, celluloses, polyethylene, polybutadiene and polyimide resin.

Examples of the thermosetting resin include epoxy resin, benzoguanamine resin, rosin modified maleic resin, rosin modified fumaric resin, melamine resin, urea resin and phenolic resin.

Examples of the photosensitive resin to be used include a resin in which a linear macromolecule having reactive substituents such as a hydroxyl group, a carboxyl group and an amino group is reacted with a (meth)acrylic compound and cinnamic acid having reactive substituents such as an isocyanate group, an aldehyde group and an epoxy group to introduce photo-crosslinkable groups such as a (meth)acryloyl group and a styryl group into the linear macromolecule.

Also, examples thereof include a resin in which a linear macromolecule containing acid anhydrides such as a styrene-maleic anhydride copolymer and an α-olefin-maleic anhydride copolymer is half-esterified by a (meth)acrylic compound having a hydroxyl group such as hydroxyalkyl (meth) acrylate.

Examples of the monomer and the oligomer contained in a precursor include acrylates and methacrylates of various kinds such as methyl (meth)acrylate, ethyl (meth)acrylate, 2-hydroxyethyl (meth)acrylate, 2-hydroxypropyl (meth) acrylate, cyclohexyl (meth)acrylate, β-carboxyethyl (meth) acrylate, polyethylene glycol di(meth)acrylate, 1,6-hexanediol di(meth)acrylate, triethylene glycol di(meth) acrylate, tripropylene glycol di(meth)acrylate, trimethylolpropane tri(meth)acrylate, pentaerythritol tri (meth)acrylate, 1,6-hexanediol diglycidyl ether di(meth) acrylate, bisphenol A diglycidyl ether di(meth)acrylate, neopentyl glycol diglycidyl ether di(meth)acrylate, dipentaerythritol hexa(meth)acrylate, tricyclodecanyl (meth) acrylate, ester acrylate, (meth)acrylate of methylolated melamine, epoxy (meth)acrylate and urethane acrylate, (meth)acrylic acid, styrene, vinyl acetate, hydroxyethyl vinyl ether, ethylene glycol divinyl ether, pentaerythritol trivinyl ether, (meth)acrylamide, N-hydroxymethyl (meth)acrylamide, N-vinyl formamide, and acrylonitrile. These monomers and oligomers contained in a precursor can be used singly of one kind or by mixture of two kinds or more.

Organic or inorganic pigments can be used singly of one kind or by mixture of two kinds or more as a coloring matter contained in the coloring composition.

A pigment high in chromogenic properties and heat resistance, particularly, a pigment high in resistance to thermal decomposition is preferable among pigments; an organic pigment is ordinarily used.

Specific examples of the organic pigment usable for the coloring composition of the present invention are hereinafter shown by color index numbers.

Examples of a red photosensitive coloring composition for forming a red region to be used include red pigments such as C. I. Pigment Red 1, 2, 3, 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 246, 254, 255, 264, 272 and 279.

The red photosensitive coloring composition can be used together with a yellow pigment and an orange pigment.

Examples of a green photosensitive coloring composition for forming a green region to be used include green pigments such as C. I. Pigment Green 7, 10, 36 and 37.

The green photosensitive coloring composition can be used together with a yellow pigment.

Examples of a blue photosensitive coloring composition for forming a blue region to be used include blue pigments such as C. I. Pigment Blue 15, 15:1, 15:2, 15:3, 15:4, 15:6, 16, 22, 60, 64 and 80.

The blue photosensitive coloring composition can be used together with violet pigments such as C. I. Pigment Violet 1, 19, 23, 27, 29, 30, 32, 37, 40, 42 and 50.

Examples of a black photosensitive coloring composition for forming a black matrix to be used include carbon black, aniline black, anthraquinone black pigment and perylene black pigment; specifically, C. I. Pigment Black 1, 6, 7, 12, 20 and 31.

A mixture of a red pigment, a blue pigment and a green pigment can be used for the black photosensitive coloring composition.

With regard to a black pigment, carbon black is preferable in view of price and light shielding properties, and may be surface-treated with a resin.

In order to adjust color tone, the black photosensitive coloring composition can be used together with a blue pigment and a violet pigment.

Carbon black preferably has a specific surface area of 50 to 200 m$^2$/g by a BET method from the viewpoint of the black matrix shape. The reason therefor is that deterioration in the black matrix shape is caused in the case of using carbon black having a specific surface area of less than 50 m$^2$/g, while a dispersing aid is excessively adsorbed in carbon black to cause the necessity of blending a large amount of a dispersing aid for developing physical properties in the case of using carbon black having a specific surface area of more than 200 m$^2$/g.

Carbon black preferably has the oil absorption amount of dibutyl phthalate (hereinafter referred to as 'DBP') of 120 cc/100 g or less in view of sensitivity; lower oil absorption amount thereof is more preferable.

In addition, the average primary particle diameter of carbon black is preferably 20 to 50 nm. Carbon black having an average primary particle diameter of less than 20 nm causes dispersion at high concentration to be difficult, so that a photosensitive black composition having favorable temporal stability is hardly obtained. On the other hand, the use of carbon black having an average primary particle diameter of more than 50 nm occasionally brings deterioration in the black matrix shape.

Examples of the inorganic pigment include metallic oxide powders such as colcothar (ferric oxide red), cadmium red, ultramarine blue, prussian blue, chrome oxide green, cobalt green, umber, titanium black and synthetic iron black, metallic sulfide powders, and metal powders.

The Inorganic pigment is used in combination with an organic pigment for securing favorable application properties, sensitivity and developability while balancing chroma and brightness. The coloring composition of the present invention can contain dyestuffs for toning within a range of not deteriorating heat resistance.

Each coloring composition can contain a solvent. The reason therefor is that a coloring matter is sufficiently dispersed in a coloring matter carrier and applied on a transparent substrate so as to be a predetermined dried film thickness to facilitate the formation of each color region and a black matrix.

Examples of the solvent include cyclohexanone, ethyl cellosolve acetate, butyl cellosolve acetate, 1-methoxy-2-propyl acetate, diethylene glycol dimethyl ether, ethyl benzene, ethylene glycol diethyl ether, xylene, ethyl cellosolve, methyl-n-amyl ketone, propylene glycol monomethyl ether toluene, methyl ethyl ketone, ethyl acetate, methanol, ethanol, isopropyl alcohol, butanol, isobutyl ketone and a petroleum solvent. These solvents can be used singly of one kind or by mixture of two kinds or more.

A coloring composition can be produced in such a manner that a coloring matter or a coloring matter composition comprising two kinds or more of coloring matters is minutely dispersed in a coloring matter carrier and a solvent preferably together with a photopolymerization initiator by using various dispersing means such as a triple roll mill, a double roll mill, a sand mill, a kneader and an attritor.

Also, a photosensitive coloring composition containing two kinds or more of coloring matters can be produced in such a manner that each coloring matter is separately dispersed minutely in a coloring matter carrier and a solvent to mix the dispersion.

Dispersing aids such as a resin pigment dispersing agent, a surface-active agent and a coloring matter derivative can properly be contained on the occasion of dispersing a coloring matter in a coloring matter carrier and a solvent.

The dispersing aids are so excellent in dispersion of a pigment (coloring matter) as to offer a great effect of preventing the pigment from reagglomerating after dispersion. Thus, a photosensitive coloring composition comprising a pigment dispersed in a coloring matter carrier and a solvent by using dispersing aids allows a color filter excellent in transparency to be formed.

The resin pigment dispersing agent has a pigment affinity site having a property of being adsorbed in a pigment, and a site compatible with a coloring matter carrier. The resin pigment dispersing agent is adsorbed in a pigment to offer the function of stabilizing dispersion of the pigment in a coloring matter carrier.

Examples of the resin pigment dispersing agent include polycarboxylate esters such as polyurethane and polyacrylate, unsaturated polyamide, polycarboxylic acid, polycarboxylic acid (partial) amine salt, polycarboxylic acid ammonium salt, polycarboxylic acid alkylamine salt, polysiloxane, long-chain polyaminoamide phosphate, hydroxyl group-containing polycarboxylate ester and modified products thereof, oily dispersing agents such as amide and salts thereof, formed by reaction of poly(lower alkyleneimine) and polyester having a free carboxyl group, a (meth)acrylic acid-styrene copolymer, a (meth)acrylic acid-(meth)acrylate copolymer, a styrene-maleic acid copolymer, water-soluble resins and water-soluble polymeric compounds such as polyvinyl alcohol and polyvinyl pyrrolidone, polyesters, modified polyacrylates, an ethylene oxide/propylene oxide addition compound, and phosphates. These resin pigment dispersing agents can be used singly of one kind or by mixture of two kinds or more.

Examples of the surface-active agent include anionic surface-active agents such as sodium lauryl sulfate, polyoxyethylene alkyl ether sulfate, sodium dodecylbenzene sulfonate, an alkaline salt of a styrene-acrylic acid copolymer, sodium stearate, sodium alkylnaphthalene sulfonate, sodium alkyl diphenyl ether disulfonate, monoethanolamine lauryl sulfate, triethanolamine lauryl sulfate, ammonium lauryl sulfate, monoethanolamine stearate, sodium lauryl sulfate, monoethanolamine of a styrene-acrylic acid copolymer and polyoxyethylene alkyl ether phosphate; nonionic surface-active agents such as polyoxyethylene oleyl ether, polyoxyethylene lauryl ether, polyoxyethylene nonylphenyl ether, polyoxyethylene sorbitan monostearate and polyethylene glycol monolaurate; cationic surface-active agents such as quaternary alkyl ammonium salt and ethylene oxide adduct thereof, and amphoteric surface-active agents such as alkyl betaine, for example, betaine alkyl dimethyl aminoacetate and alkyl imidazoline. These surface-active agents can be used singly of one kind or by mixture of two kinds or more.

The coloring matter derivative is a compound in which a substituent is introduced into an organic coloring matter, and the organic coloring matter contains an aromatic polycyclic compound in pale yellow such as naphthalene and anthraquinone, which are not generally called coloring matters.

Examples of the coloring matter derivative to be used include those described in Japanese Unexamined Patent Publication No. Sho 63-305173, Japanese Examined Patent Publication Nos. Sho 57-15620, Sho 59-40172, Sho 63-17102 and Hei 5-9469. These coloring matter derivatives can be used singly of one kind or by mixture of two kinds or more.

Examples of the photopolymerization initiator to be used include acetophenone compounds such as 4-phenoxydichloroacetophenone, 4-tert-butyl-dichloroacetophenone, diethoxyacetophenone, 1-(4-isopropylphenyl)-2-hydroxy-2-methylpropane-1-one, 1-hydroxycyclohexylphenyl ketone and 2-benzyl-2-dimethylamino-1-(4-morpholinophenyl)-butane-1-one, benzoin compounds such as benzoin, benzoin methyl ether, benzoin ethyl ether, benzoin isopropyl ether and benzyldimethyl ketal, benzophenone compounds such as benzophenone, benzoylbenzoic acid, methyl benzoylbenzoate, 4-phenylbenzophenone, hydroxybenzophenone, acrylated benzophenone, 4-benzoyl-4'-methyldiphenyl sulfide and 3,3',4,4'-tetra(tert-butylperoxycarbonyl)benzophenone, thioxanthone compounds such as thioxanthone, 2-chlorthioxanthone, 2-methylthioxanthone, isopropylthioxanthone, 2,4-diisopropylthioxanthone and 2,4-diethylthioxanthone, triazine compounds such as 2,4,6-trichloro-s-triazine, 2-phenyl-4,6-bis(trichloromethyl)-s-triazine, 2-(para-methoxyphenyl)-4,6-bis(trichloromethyl)-s-triazine, 2-(para-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis(trichloromethyl)-s-triazine, 2,4-trichloromethyl-(piperonyl)-6-triazine and 2,4-trichloromethyl(4'-methoxystyryl)-6-triazine, oxime ester compounds such as 1,2-octanedione, 1-[4-(phenylthio)-,2-(O-benzoyloxime)] and O-(acetyl)-N-(1-phenyl-2-oxo-2-(4'-methoxy-naphtyl) ethylidene)hydroxylami ne, phosphine compounds such as bis(2,4,6-trimethylbenzoyl)phenylphosphine oxide and 2,4,6-trimethylbenzoyldiphenylphosphine oxide, quinone compounds such as 9,10-phenanthrene quinone, camphorquinone and ethyl anthraquinone, borate compounds, carbazole compounds, imidazole compounds, and titanocene compounds. These photopolymerization initiators can be used singly of one kind or by mixture of two kinds or more.

The used amount of the photopolymerization initiator is preferably 0.5 to 45% by mass, more preferably 3 to 30% by mass and further preferably 4 to 10% by mass on the basis of the total solid content of the photosensitive coloring composition.

In addition, a sensitizer including amine compounds such as triethanolamine, methyldiethanolamine, triisopropanolamine, methyl 4-dimethylaminobenzoate, ethyl 4-dimethylaminobenzoate, isoamyl 4-dimethylaminobenzoate, 2-dimethylaminoethyl benzoate, 2-ethylhexyl 4-dimethylaminobenzoate, N, N-dimethylpara-toluidine, 4,4'-bis(dimethylamino)benzophenone, 4,4'-bis(diethylamino)benzophenone and 4,4'-bis(ethylmethylamino)benzophenone may be used together. These sensitizers can be used singly of one kind or by mixture of two kinds or more.

Among the above-mentioned sensitizers, 4,4'-bis(dimethylamino)benzophenone and 4,4'-bis(diethylamino)benzophenone are preferable, and 4,4'-bis(diethylamino)benzophenone is more preferable.

The used amount of the sensitizer is preferably 0.5 to 55% by mass, more preferably 2.5 to 40% by mass and further preferably 3.5 to 25% by mass on the basis of the total amount of the photopolymerization initiator and the sensitizer.

The photosensitive coloring composition can further contain polyfunctional thiol serving as a chain transfer agent.

The polyfunctional thiol may be a compound having two or more thiol groups. Examples of the polyfunctional thiol include hexanedithiol, decanedithiol, 1,4-butanediolbisthiopropionate, 1,4-butanediolbisthioglycolate, ethylene glycol bisthioglycolate, ethylene glycol bisthiopropionate, trimethylolpropane tristhioglycolate, trimethylolpropane tristhiopropionate, trimethylolpropane tris(3-mercaptobutyrate), pentaerythritol tetrakisthioglycolate, pentaerythritol tetrakisthiopropionate, trimercaptopropionic acid tris(2-hydroxyethyl)isocyanurate, 1,4-dimethylmercaptobenzene, 2,4,6-trimercapto-s-triazine and 2-(N,N-dibutylamino)-4,6-dimercapto-s-triazine. These polyfunctional thiols can be used singly of one kind or by mixture of two kinds or more.

The used amount of the polyfunctional thiol is preferably 0.1 to 30% by mass, more preferably 1 to 20% by mass on the basis of the total solid content of the photosensitive coloring composition.

The photosensitive coloring composition can be prepared in the form of a coloring resist material of solvent development type or alkaline development type. The coloring resist material is a material in which a coloring matter is dispersed in a composition containing a thermoplastic resin, a thermosetting resin or a photosensitive resin, a monomer, a photopolymerization initiator, and a solvent. The coloring matter is preferably contained at a ratio of 5 to 70% by mass, more preferably 20 to 50% by mass on the basis of the total solid content of the photosensitive coloring composition, and the residual amount thereof is substantially composed of a resinous binder offered by a coloring matter carrier.

With regard to the photosensitive coloring composition, it is preferable to perform the removal of coarse particles contained therein of 5 μm or more, preferably 1 μm or more and more preferably 0.5 μm or more, and dust mixed thereinto. The removal of the coarse particles and the dust can be performed by means such as centrifugal separation, sintered filtering and membrane filtering.

With regard to the formation of each color region and the black matrix, a photosensitive coloring composition prepared as a coloring resist material of solvent development type or alkaline development type is applied on a transparent substrate so as to be a predetermined dried film thickness. Examples of this application method to be used include spray coating, spin coating, slit coating and roll coating. The film, dried as required, is subjected to ultraviolet exposure through a mask having a predetermined pattern provided in contact or non-contact with this film. Thereafter, the film is immersed in a solvent or an alkaline developing solution, or is sprayed with the developing solution by a spray to remove uncured portions and then formed into a desirable pattern. In addition, in order to promote polymerization of the coloring resist material, heating can be performed as required. A black matrix and each color region are sequentially formed on a transparent substrate, so that a color filter can be formed thereon. Such a photolithographic method allows each color region and a black matrix to be formed with higher accuracy than a printing method.

On the occasion of development, an aqueous solution of sodium carbonate, sodium hydroxide and the like is used as the alkaline developing solution. An organic alkali such as dimethylbenzylamine and triethanolamine can also be used as the alkaline developing solution. An antifoaming agent and a surface-active agent can also be added to the developing solution.

A shower development method, a spray development method, a dip (immersion) development method and a puddle (liquid heap) development method can be applied as development processing methods.

In order to improve ultraviolet exposure sensitivity, after the above-mentioned coloring resist material is applied and dried, a water-soluble or alkali-soluble resin (such as polyvinyl alcohol and water-soluble acrylic resin) can also be applied and dried to form a film for preventing inhibition of polymerization due to oxygen and thereafter perform ultraviolet exposure.

<Preferable Configuration Example of Liquid Crystal Panel of the Present Invention>

Figure 3:
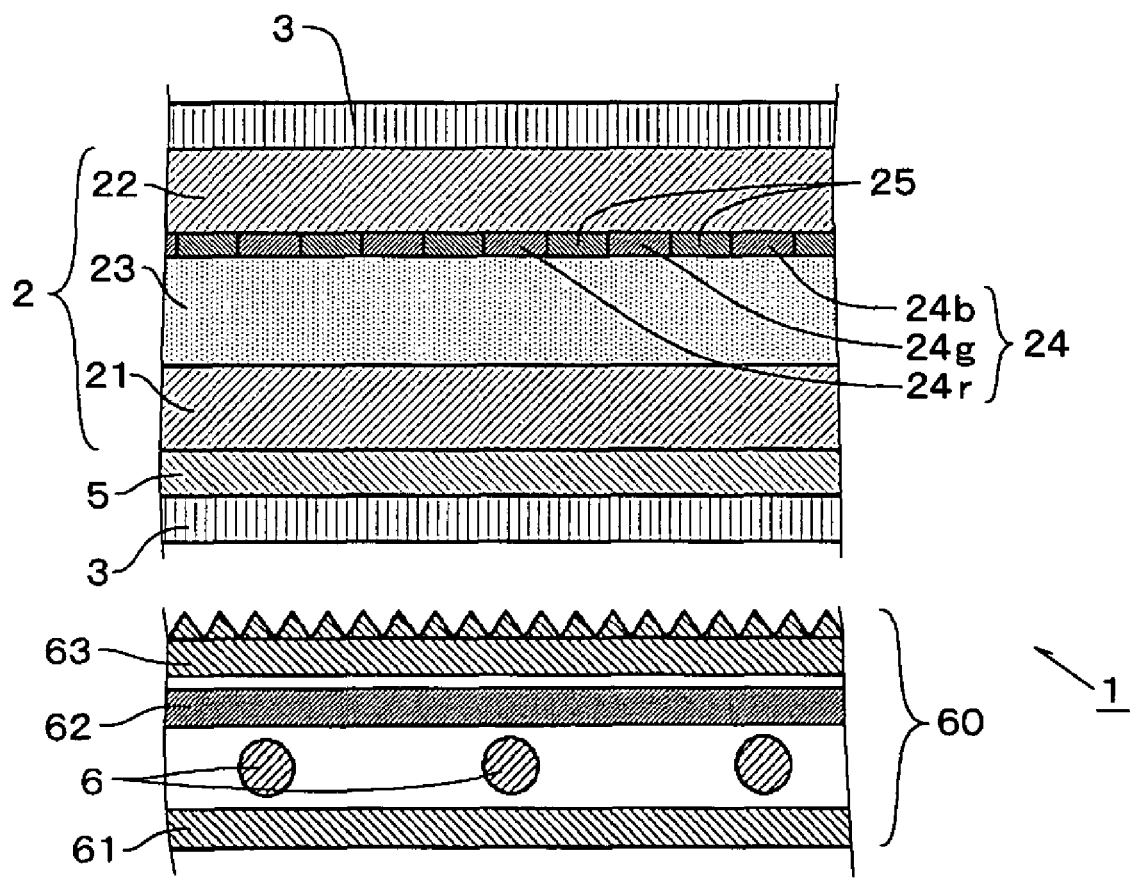
FIG. 3 is a partially omitted reference cross-sectional view showing one configuration example of a liquid crystal panel of the present invention.

A liquid crystal panel 1 of the present invention is provided with a liquid crystal cell 2, polarizers 3, 3 provided on each of the visible side and the back side of this liquid crystal cell 2, an optical compensating layer 5 provided between the polarizer 3 and the liquid crystal cell 2, and a light source 6, as shown in FIG. 3, for example.

The liquid crystal cell 2 has a pair of transparent substrates 21, 22 at least one of which is provided with a color filter having each region of blue, green and red, and a liquid crystal layer 23 in which a liquid crystal material is injected between the substrates 21, 22.

Specifically, one transparent substrate 21 (active matrix substrate) is provided with a switching element (typically, TFT) for controlling electro-optical properties of liquid crystal, and a scanning line for allowing a gate signal to this switching element and a signal line for allowing a source signal thereto (both are not shown). The other transparent substrate 22 (color filter substrate) is provided with a color filter 24. The color filter 24 may be provided on the active matrix substrate. A gap between the substrates 21, 22 is controlled by a spacer (not shown). The side of the substrate, contacting with the liquid crystal layer, is provided with an oriented film (not shown) made of polyimide, for example.

A conventionally known liquid crystal material is injected into the liquid crystal layer 23. The form of the liquid crystal layer 23 is not particularly limited and yet a liquid crystal layer of a vertical alignment type is preferable. With regard to a liquid crystal cell of a vertical alignment type, the major axis of a liquid crystal material is aligned approximately vertical to the substrate when no voltage is applied. Such a liquid crystal cell of a vertical alignment type can be configured, for example, by injecting cylindrical liquid crystal having negative dielectric anisotropy into the liquid crystal layer.

The transparent substrates 21, 22 are not particularly limited and usable examples thereof include transparent glass plates such as soda-lime glass, low-alkali borosilicate glass and no-alkali aluminoborosilicate glass, and transparent flexible plates having flexibility, for example, optical resin plates such as polycarbonate, polymethyl methacrylate and polyethylene terephthalate.

The above-mentioned color filter 24 has a blue color filter 24b, a green color filter 24g and a red color filter 24r formed with a predetermined pattern (for example, stripes) on the transparent substrate 22, and a black matrix 25 with a predetermined pattern is formed between each of the color filters.

As the polarizer 3, a polarizer which converts natural light or polarized light into linearly polarized light can be properly adopted. The polarizer is preferably a stretched film having as the main component a vinyl alcohol polymer containing iodine or a dichromatic dye. The thickness of the above-mentioned polarizer 3 is typically 5 to 50 μm. The polarizer 3 is preferably a polarizer on which a protective film is laminated on at least one plane thereof (also referred to as a polarizing plate). As the protective film, one which is excellent in transparency can be properly adopted. The above-mentioned protective film is used for preventing the polarizer from contracting and expanding, and deteriorating due to ultraviolet rays. The above-mentioned protective film is preferably a polymeric film containing a cellulose polymer or a norbornene polymer. The thickness of the protective film is typically 10 to 200 μm.

The light source 6, as described in detail above, can properly be selected from among a back light, a front light or a side light in accordance with the form of the liquid crystal panel. A light unit 60 provided with the light source (back light) on the back side of the liquid crystal cell is exemplified in FIG. 3. The three-wavelength tube (for example, fluorescent light) as described above can be used as a kind of the light source 6.

In the case of adopting a back light mode, the above-mentioned light unit 60 is preferably provided with at least the light source 6, a reflective film. 61, an diffuser plate 62 and a prism sheet 63. In the case of adopting a side light mode, the light unit 60 is preferably provided with at least a light guide plate and a light reflector in addition to the above-mentioned configuration.

Next, the optical compensating layer 5, as shown in the drawing, is provided on the back side of the liquid crystal cell 2 (between the backside polarizer 3 and the liquid crystal cell 2). The optical compensating layer 5, though not particularly shown in the drawing, may be provided on the visible side of the liquid crystal cell 2 (between the visible polarizer 3 and the liquid crystal cell 2). Also, the optical compensating layer 5 can each be provided on both of the sides. The optical compensating layer 5 is preferably bonded directly to the surface of the liquid crystal cell 2 through an adhesive component such as a tackiness agent, but yet other optical members may intervene between the liquid crystal cell 2 and the optical compensating layer 5.

In the present invention, the optical compensating layer 5, as described in detail above, properly adopts one which can cancel out retardation in the thickness direction for light which passes through a green region of the liquid crystal cell 2 and retardation in the thickness direction for light which passes through a red region thereof.

Examples of optical properties of the above-mentioned optical compensating layer include an optically uniaxial compensating layer having the relation of $nx_R \cong ny_R > nz_R$ or an optically biaxial compensating layer having the relation of $nx_R > ny_R > nz_R$.

In the expression, $nx_R$ denotes a refractive index in the x-axis direction in the plane of the optical compensating layer (a direction for the maximum refractive index in the plane), $ny_R$ denotes a refractive index in the y-axis direction in the plane of the optical compensating layer (a direction orthogonal to the x-axis in the plane), and $nz_R$ denotes a refractive index in a direction orthogonal to the x-axis direction and the y-axis direction (a thickness direction).

The optical compensating layer having the relation of $nx_R \cong ny_R > nz_R$ can preferably compensate retardation of the liquid crystal cell in a vertical alignment mode. The optical compensating layer having the relation of $nx_R > ny_R > nz_R$ has the effect of preventing a screen from being colored in blue and the like for the reason that the axis of the polarizer is shifted from crossed nicols in the case of viewing from an oblique direction, as well as viewing angle compensation of the liquid crystal cell. The above-mentioned optical compensating layer having the relation of $nx_R \cong ny_R > nz_R$ is preferably disposed adjacently to the liquid crystal cell. In the present invention, the optical compensating layer can be configured in one layer or by laminating two or more different layers.

<Liquid Crystal Display Device>

The liquid crystal display device of the present invention includes the above-mentioned liquid crystal panel.

The liquid crystal display device of the present invention is used for optional appropriate uses. Examples of the uses include office automation equipments such as a personal computer monitor, a notebook computer and a copying machine, portable equipments such as a portable telephone, a watch, a digital camera, a personal digital assistant (PDA) and a portable game machine, domestic electrical equipments such as a video camera, a television set and a microwave oven, on-vehicle equipments such as a back monitor, a monitor for a car navigation system and a car audio, display equipments such as an information monitor for a commercial store, security equipments such as an observation monitor, and care/medical equipments such as a care monitor and a medical monitor.

The uses of the liquid crystal display device of the present invention are preferably a television set. The screen size of the above-mentioned television set is preferably wide 17 type (373 mm×224 mm) or more, more preferably wide 23 type (499 mm×300 mm) or more and particularly preferably wide 32 type (687 mm×412 mm) or more.

What is claimed is:

1. A liquid crystal panel comprising:
a liquid crystal cell having a pair of transparent substrates provided with a color filter having each color region of blue, green and red, and a liquid crystal layer formed by injecting a liquid crystal material between the transparent substrates;
an optical compensating layer provided over the liquid crystal cell; and
a light source for irradiating light;
wherein the optical compensating layer is a single film of uniform thickness which exhibits wavelength dispersion canceling out retardation in the thickness direction for light of a wavelength (G) passing through a green region of the liquid crystal cell, and retardation in the thickness direction for light of a wavelength (R) passing through a red region of the liquid crystal cell; and
the wavelength (G) represents a wavelength (nm) in which [luminous coefficient Y×emission spectrum of a light source] becomes the maximum in light of the light source passing through the green region of the liquid crystal cell, and the wavelength (R) represents a wavelength (nm) in which [luminous coefficient Y×emission spectrum of a light source] becomes the maximum in light of the light source passing through the red region of the liquid crystal cell.

2. A liquid crystal panel comprising:
a liquid crystal cell having a pair of transparent substrates provided with a color filter having each color region of blue, green and red, and a liquid crystal layer formed by injecting a liquid crystal material between the transparent substrates;
an optical compensating layer provided over the liquid crystal cell; and
a light source for irradiating light;
wherein the liquid crystal layer is a vertical alignment type; and
a relation between a retardation value in the thickness direction of the optical compensating layer $Rth_R(\lambda)$ and a retardation value in the thickness direction of the liquid crystal cell $Rth_L(\lambda)$ satisfies either of the following expression (1) and the following expression (2):

$$1.00 < Rth_R(610)/Rth_R(550) < 1.03 \text{ and } |Rth_L(550) - Rth_L(610)| \leq 18 \text{ Nm} \quad \text{the expression (1):}$$

$$0.96 < Rth_R(610)/Rth_R(550) < 1.00 \text{ and } |Rth_L(550) - Rth_L(610)| \leq 6 \text{ nm} \quad \text{the expression (2):}$$

wherein $Rth_R(550)$ represents a retardation value in the thickness direction of the optical compensating layer for light with a wavelength of 550 nm, and $Rth_R(610)$ represents a retardation value in the thickness direction of the optical compensating layer for light with a wavelength of 610 nm, and $Rth_L(550)$ represents a retardation value in the thickness direction (nm) of the liquid crystal cell for light with a wavelength of 550 nm passing through a green region, and $Rth_L(610)$ represents a retardation value in the thickness direction (nm) of the liquid crystal cell for light with a wavelength of 610 nm passing through a red region.

3. The liquid crystal panel according to claim 1 or 2, being transmissive type or semitransmissive type, wherein the light source is disposed on the back side of the liquid crystal cell.

4. The liquid crystal panel according to claim 3, wherein the light source is a three-wavelength tube.

5. The liquid crystal panel according to claim 3, wherein the optical compensating layer is at least either of a compensating layer having a relation of $nx_R \cong ny_R > nz_R$ and a compensating layer having a relation of $nx_R > ny_R > nz_R$
wherein $nx_R$ denotes a refractive index in the x-axis direction in a plane of the optical compensating layer (a direction for the maximum refractive index in the plane), $ny_R$ denotes a refractive index in the y-axis direction in a plane of the optical compensating layer (a direction orthogonal to the x-axis in the plane), and $nz_R$ denotes a refractive index in a direction orthogonal to the x-axis direction and the y-axis direction.

6. A liquid crystal display device comprising the liquid crystal panel according to claim 1 or 2.

* * * * *